United States Patent Office 3,227,758
Patented Jan. 4, 1966

---

3,227,758
PHENALKYLAMINES
Sidney B. Richter and David P. Mayer, Chicago, Ill., assignors to Velsicol Chemical Corporation, Chicago, Ill., a corporation of Illinois
No Drawing. Filed July 10, 1962, Ser. No. 208,906
5 Claims. (Cl. 260—570.9)

This invention relates to the production of new pesticidal compositions of matter. More specifically, this invention relates to new chemical compounds of the general formula

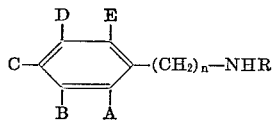

wherein $n$ is a whole number from 1 to 3; A, B, C, D, and E are selected from the group consisting of lower unsubstituted alkyl, lower unsubstituted alkoxy, lower unsubstituted alkylmercapto, halogen, mercapto, nitro, amino, and hydrogen, provided that a maximum of four of A, B, C, D, and E are hydrogen, provided that a maximum of three of A, B, C, D, and E are hydrogen when one of A, B, C, D, and E is lower unsubstituted alkoxy, and a maximum of one of A, B, C, D, and E is halogen when one of A, B, C, D, and E is lower unsubstituted alkoxy, and R is a phenyl radical substituted with from one to three substituents selected from the group consisting of bromine, chlorine, lower unsubstituted alkyl, lower unsubstituted alkoxy, lower unsubstituted alkylmercapto, mercapto, and nitro.

The compounds of this invention can also be represented by the following general formula

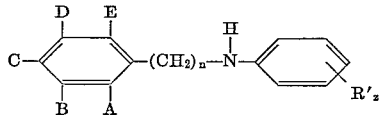

wherein $n$, A, B, C, D, and E are as defined above, $z$ is a whole number from 1 to 3, and R' is selected from the group consisting of bromine, chlorine, lower unsubstituted alkyl, lower unsubstituted alkoxy, lower unsubstituted alkylmercapto, mercapto, and nitro. In a preferred embodiment of this invention, a maximum of two of A, B, C, D, and E are any one of the groups lower unsubstituted alkyl, lower unsubstituted alkoxy, lower unsubstituted alkylmercapto, mercapto, or nitro. By lower alkyl, lower alkoxy and lower alkylmercapto are meant those groups containing up to four carbon atoms. The new compounds of this invention are useful as pesticides, particularly as herbicides, insecticides, and miticides.

The new compounds of this invention can be prepared by the condensation of compounds of the formula

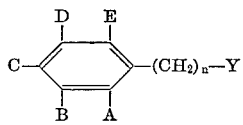

wherein Y is chlorine or bromine and $n$, A, B, C, D, and E are as defined above, with amines $H_2NR$, wherein R is also as defined above. The starting materials of the structural formula given comprise the appropriately substituted benzyl, phenethyl, and propylbenzene chlorides or bromides. Typical examples of such compounds useful in the preparation of the new compounds of this invention include 2-chloro-6-nitrobenzyl bromide, 3,5-dinitrobenzyl bromide, m-nitrobenzyl bromide, p-butyl-benzyl chloride, 2,4-dinitrobenzyl chloride, p-ethylbenzyl chloride, m-nitrobenzyl chloride, 3,5-dimethoxybenzyl chloride, p-nitrobenzyl chloride, 2,6-dichlorobenzyl bromide, 2-chloro-5-nitrobenzyl chloride, 2-nitro-5-chlorobenzyl chloride, 2,5-dimethoxybenzyl bromide, 2,6-dimethoxybenzyl chloride, p-butylbenzyl chloride, 3,4-diethoxybenzyl chloride, p-bromobenzyl chloride, 2-ethyl-5-nitrobenzyl chloride, o-propylbenzyl chloride, 2-ethyl-4-nitrobenzyl chloride, 4-ethyl-2-nitrobenzyl chloride, 2-methoxy-5-chlorobenzyl chloride, 3-bromo-4-methoxybenzyl chloride, 2-methyl-4-methoxy-5-nitrobenzyl chloride, 2-methoxy-5-nitrobenzyl chloride, o-aminobenzyl chloride, 4-(methylthio)benzyl chloride, 4-chlorophenethyl chloride, 4-nitrophenethyl chloride, 2-chloro-5-methoxyphenethyl bromide, 3-chloro-4- methoxyphenethyl bromide, 2-fluoro-4-methoxyphenethyl bromide, 4-tert-butylphenethyl bromide, 3-ethylphenethyl bromide, 1-(3-bromopropyl)-4-tert-butylbenzene, 1-(3 - bromopropyl)-4-nitrobenzene, 3,5-dibromobenzyl bromide, 2,4,6-tribromobenzyl bromide, and the like.

Suitable reactants of the formula $H_2NR$ include a wide variety of anilines substituted with $R'_z$ as defined above. Some typical suitable reactants are, for example, m-bromoaniline, p-bromoaniline, 2-bromo - 4 - tert-butylaniline, 2-bromo-4-ethylaniline, 5 - bromo - 2 - (ethylthio)aniline, 2-bromo-6-isopropylaniline, 2-bromo-4-nitroaniline, m-butoxyaniline, 2-butoxy-5-nitroaniline, p-tert-butylaniline, 5-butyl-2-chloroaniline, 5-butyl-2-ethylaniline, 4-butyl-3-nitroaniline, m-chloroaniline, 2-chloro-3-nitroaniline, 2,4-dibromoaniline, 2,6-dibromo-4-nitroaniline, 2,4-dichloroaniline, 2,5-dichloroaniline, 3,4-dichloroaniline, 3,5-dichloroaniline, 2,4-dichloro-5-nitroaniline, 2-ethyl-6-nitroaniline, p-(ethylthio)aniline, o-methylthioaniline, m-methylthioaniline, p-methylthioaniline, 2-(methylthio)-5-nitroaniline, m-nitroaniline, o-propoxyaniline, m-propylaniline, p-(propylthio)aniline, 2,4,6 - tribromoaniline, 2,4,5-trichloroaniline, 2,4,6-trichloroaniline, 3,4,5-trichloroaniline, p-(butylthio)aniline, 4-bromo-m-anisidine, (where anisidine is ar-methoxyaniline), 2-chloro-m-anisidine, 4-chloro-m-anisidine, 6 - chloro-m-anisidine, 2 - nitro-m-anisidine, 4-nitro-m-anisidine, 3-bromo-o-anisidine, 4-chloro-o-anisidine, 5-chloro-o-anisidine, 3,5-dichloro-o-anisidine, 4,5-dichloro-o-anisidine, 4-nitro-o-anisidine, 3-bromo-p-anisidine, 3-chloro-p-anisidine, 5-chloro - 2 - nitro-p-anisidine, 3,5-dibromo-p-anisidine, 3,5-dichloro-p-anisidine, 2-nitro-p-anisidine, 2-chloro-m-toluidine (where toluidine is ar-methylaniline), 4-nitro-m-toluidine, 4-bromo-o-toluidine, 4-chloro-o-toluidine, 4,5 - dibromo - o - toluidine, 4,5-dichloro-o-toluidine, 3-nitro-o-toluidine, 2-bromo-p-toluidine, 3-chloro-p-toluidine, 3,5-dibromo-p-toluidine, 3-nitro-p-toluidine, o-aminobenzenethiol, m-aminobenzenethiol, p-aminobenzenethiol, and the like. The designation "methylthio" has been retained for the group $CH_3S$—, for example, according to Chemical Abstracts indexing of such known starting materials. However, it is preferred for the new compounds of this invention to use the designation "methylmercapto" for the same group. Other members of the lower alkylmercapto group are named similarly.

When the condensation reaction to form the new compounds of this invention is carried out, an excess of the amine should be used, since the hydrogen halide released during the reaction is taken up by some of the free amine. Preferably two moles of amine are used for each mole of the halide starting material. Further, many of the substituted anilines $H_2NR$ are not strongly basic, and it is often desirable to incorporate an acid scavenger such as sodium bicarbonate in the reaction mixture. The reaction can be carried out conveniently by heating the reactants, preferably in an inert solvent such as benzene or toluene. The exact reaction temperatures are not critical, since the reaction will often take place at normal room temperature; however, temperatures which are the normal reflux temperature of the reaction mixture are preferred. The reaction will often be complete in a few hours. Generally, a precipitate of amine hydrochloride or hydrobromide will form in the reaction mixture and can be filtered off. The product can be isolated from the reaction mixture by ether extraction; and it can be purified by crystallization, fractional distillation, or other techniques known to the art. Although the reaction is normally carried out at atmospheric pressure, sub- or superatmospheric pressures can also be used if desired.

The manner in which typical new compounds of this invention can be prepared is illustrated in the following example. All temperatures are in degrees centigrade.

EXAMPLE 1

*Preparation of N-(3,4-dichlorophenyl) - 2 - methoxy - 5- chlorobenzylamine*

A mixture of 342 g. 3,4-dichloroaniline, 88 g. sodium bicarbonate, and 80 ml. water is stirred and heated to about 80° in a 2-l. flask to melt the solid. 2-methoxy-5-chloro-benzyl chloride (150 g.) is added over a period of 0.5 hr., and the mixture is then stirred and refluxed for 7 hrs. After cooling, about 500 ml. of ether is added. The ether layer is separated, washed with water, dried over magnesium sulfate, filtered, and evaporated. The residue is fractionally distilled in vacuo. In addition to a fraction of any unreacted dichloroaniline (B.P 102°/0.5 mm.), there is obtained as the main fraction the desired N-(3,4-dichlorophenyl)-2-methoxy-5-chlorobenzylamine.

A wide variety of other useful new compounds within the scope of this invention can be prepared in a manner similar to that detailed above. Given in the following examples are the reactants which can be used to give the indicated named compounds of this invention.

EXAMPLE 2

3,5 - dinitrobenzyl bromide+m - bromoaniline=N - (3-bromophenyl)-3,5-dinitrobenzylamine.

EXAMPLE 3 p-Butylbenzyl chloride+m-butoxyaniline=N-(3-butoxyphenyl)-p-butylbenzylamine.

EXAMPLE 4

2-chloro-5-nitrobenzyl chloride+p - tert-butyl-aniline= N-(4-tert-butylphenyl)-2-chloro-5-nitrobenzylamine.

EXAMPLE 5

2,5-dimethoxybenzyl bromide+5 - butyl-2-chloro-aniline=N - (5-butyl-2-chlorophenyl)-2,5-dimethoxybenzylamine.

EXAMPLE 6 p - Bromobenzyl chloride+2-chloro-3-nitroaniline=N-(2-chloro-3-nitrophenyl)-p-bromobenzylamine.

EXAMPLE 7

2 - ethyl - 5 - nitrobenzyl chloride+o-methyl-thionaniline=N - (2-methylmercaptophenyl)-2-ethyl-5-nitro-benzylamine.

EXAMPLE 8 o-Aminobenzyl chloride+4-chloro-m-anisidine=N-(3-methoxy-4-chlorophenyl)-o-aminobenzylamine.

EXAMPLE 9

4 - (methylthio)benzyl chloride+2 - nitro - m-anisidine=N - (2-nitro-3-methoxyphenyl)-4-(methyl-mercapto)benzylamine.

EXAMPLE 10

2,4,6 - tribromobenzyl chloride+4 - chloro - m-anisidine=N - (3 - methoxy-4-chlorophenyl)-2,4,6-tribromobenzylamine.

EXAMPLE 11 o - Propylbenzyl chloride+4-bromo-o-toluidine=N-(2-methyl-4-bromophenyl)-o-propylbenzylamine.

EXAMPLE 12

4-chlorophenethyl chloride+o-aminobenzene-thiol=N-(2-mercaptophenyl)-4-chlorophenethylamine.

EXAMPLE 13

4 - nitrophenethyl chloride+p - (butylthio)-aniline=N-(4-butylmercaptophenyl)-4-nitrophenethylamine.

EXAMPLE 14

3 - chloro-4-methoxyphenethyl bromide+4-bromo-m-anisdine=N - (3-methoxy-4-bromophenyl)-3-chloro-4-methoxy-phenethylamine.

EXAMPLE 15

4 - tert-butylphenethyl bromide+m-nitroaniline=N-(3-nitrophenyl)-4-tert-butylphenethylamine.

EXAMPLE 16

1 - (3-bromopropyl)-4-tert-butylbenezene+m-nitroaniline=N - (3 - nitrophenyl)-3-(4-tert-butylphenyl)propylamine.

EXAMPLE 17

1 - (3-bromopropyl)-4-nitrobenzene+3,5-dichloro-aniline=N - (3,5-dichlorophenyl)-3-(4-nitrophenyl)propylamine.

EXAMPLE 18 p - Nitrobenzyl chloride+p-(propylthio)aniline=N-(4-propylmercaptophenyl)-p-nitrobenzylamine.

EXAMPLE 19

2,6 - dichlorobenzyl bromide+m-butoxyaniline=N-(3-butoxyphenyl)-2,6-dichlorobenzylamine.

EXAMPLE 20

3 - bromo - 4 - methoxybenzyl - chloride+m-nitro-aniline=N-(3-nitrophenyl)-3-bromo-4-methoxybenzylamine.

For practical use as pesticides, the compounds of this invention are generally incorporated into herbicidal, insecticidal, and miticidal compositions which comprise an inert carrier and a pesticidally toxic amount of such a compound. Such compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixture of nonionic with anionic surface-active agents.

A typical composition according to this invention is illustrated by the following example, in which the quantities are in parts by weight.

EXAMPLE 21

*Preparation of a dust*

| | |
|---|---|
| Product of Example 1 | 10 |
| Powdered talc | 90 |

The above ingredients are mixed in a mechanical grinder-blender and are ground until a homogeneous, free-flowing dust of the desired particle size is obtained. This dust is suitable for direct application to the site of the pest infestation.

The pesticides of this invention can be applied in any manner recognized by the art. The concentration of the new compounds of this invention in the compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects and mites. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the woolly apple aphid, the Japanese bettle, and the corn rootworm.

Mites and ticks are not true insects . Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, ryegrass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, nad winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

What is claimed is:

1. A compound of the general formula

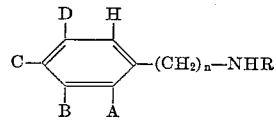

wherein *n* is a whole number from 1 to 3; A, B, C and D are selected from the group consisting of lower unsubstituted alkyl, lower unsubstituted alkoxy, lower unsubstituted alkyl mercapto, halogen, mercapto and hydrogen with a minimum of 1 and a maximum of 3 of A, B, C and D being hydrogen; and R is a phenyl radical substituted with from one to three substituents selected from the group consisting of bromine, chlorine, lower unsubstituted alkyl, lower unsubstituted alkoxy, lower unsubstituted alkylmercapto and mercapto.

2. N-(3,4-dichlorophenyl)-2-methoxy-5-chlorobenzylamine.
3. N-(3-butoxyphenyl)-p-butylbenzylamine.
4. N-(4-tert-butylphenyl)-2-chloro-5-nitrobenzylamine.
5. N-(5-butyl-2-chlorophenyl)-2,5-dimethoxybenzylamine.

References Cited by the Examiner

UNITED STATES PATENTS

| | | | |
|---|---|---|---|
| 2,764,591 | 9/1956 | Sprinzak | 260—570.9 XR |
| 2,784,138 | 3/1957 | Wegler et al. | 200—570.9 XR |
| 2,862,966 | 12/1958 | Surrey | 260—570.9 XR |
| 2,962,531 | 11/1960 | Coffield | 260—570.9 |
| 2,981,619 | 4/1961 | Josephs | 71—2.3 |
| 3,070,628 | 12/1962 | Lemin | 260—570.9 |
| 3,072,472 | 1/1963 | Josephs | 71—2.3 |
| 3,113,067 | 12/1963 | Strufe et al. | 167—30 |

OTHER REFERENCES

Clemo et al.: "Jour. Chem. Soc. London," 1953, pages 678–83.

Forbes et al.: "Jour. Chem. Soc. London," 1956, pages 513–17.

Graymore et al.: "Jour. Chem. Soc. London," 1945, pages 293–4.

Kuehne et al.: "Chemical Abstracts," vol. 54, pages 5502–05, page 5505 relied on (1960).

Sugasawa et al.: "Chemical Abstracts," vol. 50, pages 13913–4 (1956).

CHARLES B. PARKER, *Primary Examiner.*

JULIAN S. LEVITT, *Examiner.*